United States Patent

Hattori et al.

[11] Patent Number: 5,182,982
[45] Date of Patent: Feb. 2, 1993

[54] CONTINUOUS VACUUM FRIER

[75] Inventors: Ryuichi Hattori, Kyoto; Nobuhide Nakagawa, Kashihara, both of Japan

[73] Assignee: House Food Industrial Co., Ltd., Osaka, Japan

[21] Appl. No.: 554,378

[22] Filed: Jul. 19, 1990

[30] Foreign Application Priority Data

Jul. 20, 1989 [JP] Japan ............... 1-188015

[51] Int. Cl.⁵ .................... A47J 37/12; B04B 5/10
[52] U.S. Cl. .................... 99/404; 99/355; 99/407; 99/511
[58] Field of Search ............ 99/404, 405, 407, 408, 99/355, 511; 210/360.1, 369, 377, 380.1

[56] References Cited

U.S. PATENT DOCUMENTS

| | | | |
|---|---|---|---|
| 1,518,206 | 12/1924 | Kramer | 99/404 |
| 2,042,262 | 5/1936 | Lagaard | 99/405 X |
| 2,134,088 | 10/1938 | Obdyke | 99/407 X |
| 2,272,175 | 2/1942 | Jordan | 210/369 |
| 2,603,143 | 7/1952 | Saenz | 99/404 X |
| 2,696,776 | 12/1954 | McBean et al. | 99/404 X |
| 2,886,439 | 5/1959 | Eytinge | 99/407 X |
| 2,889,930 | 6/1959 | Tholl et al. | 210/369 |
| 2,917,008 | 12/1959 | Kipnis | |
| 2,932,401 | 4/1960 | Tholl | 210/369 |
| 3,022,722 | 2/1962 | Arvan | 99/404 X |
| 3,218,959 | 11/1965 | Swisher | 99/404 X |
| 3,573,059 | 3/1971 | Yuki | 99/404 X |
| 3,573,861 | 4/1971 | Lecrone | 99/404 |
| 3,585,923 | 6/1971 | Waller | 99/404 X |
| 3,812,775 | 5/1974 | Sijbring | |
| 4,059,046 | 11/1977 | Yamazaki et al. | 99/405 X |
| 4,372,200 | 2/1983 | Caridis et al. | 99/404 |
| 4,488,478 | 12/1984 | Leeper | 99/330 |
| 4,882,984 | 11/1989 | Eves, II | 99/407 X |
| 4,887,524 | 12/1989 | Ellis-Brown | 99/404 X |
| 5,066,505 | 11/1991 | Vos et al. | |

FOREIGN PATENT DOCUMENTS 998725  1/1952  France .
1306757 2/1963  France .

Primary Examiner—Harvey C. Hornsby
Assistant Examiner—C. Cooley
Attorney, Agent, or Firm—Mason, Fenwick & Lawrence

[57] ABSTRACT

A continuous vacuum frier feeds material along a path of conveyance within a vacuum frying chamber while maintaining the chamber vacuum. A frier comprises material conveying means for conveying the material through frying oil. The material conveying means includes endless belt means having a plurality of openings formed therein and a plurality of partitioning members extending downwardly from the endless belt means and each having a plurality of apertures formed therein. The partitioning members defines a plurality of compartments which receive the material and in which the material are fried and conveyed.

26 Claims, 10 Drawing Sheets

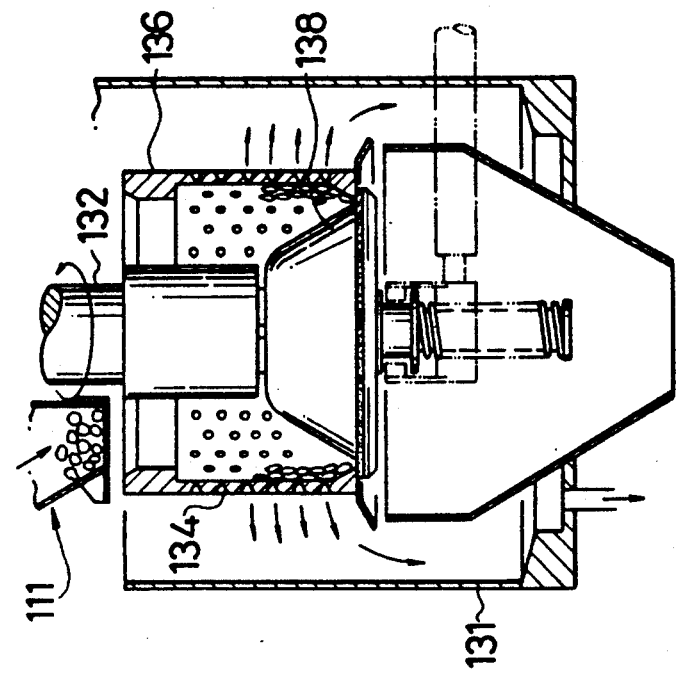
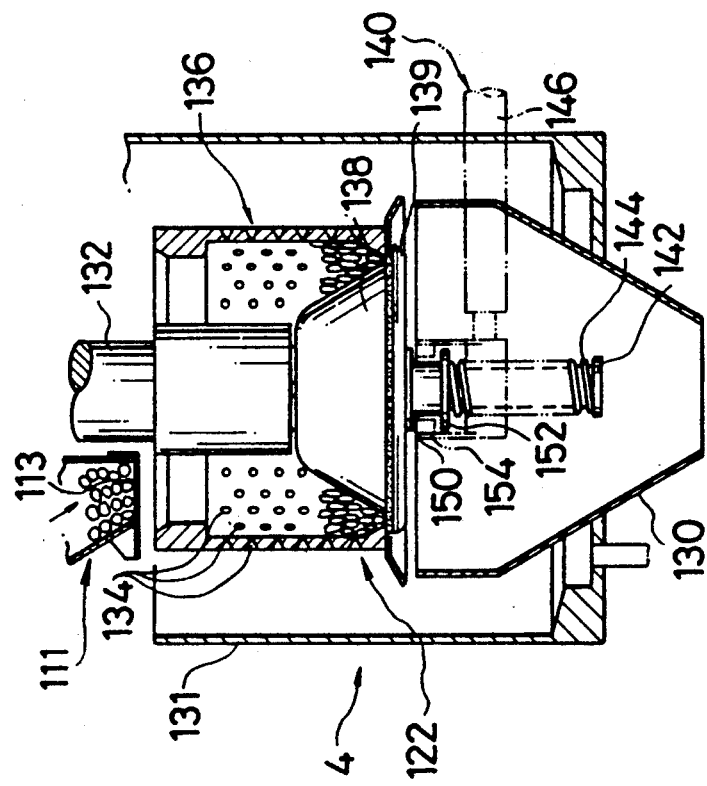

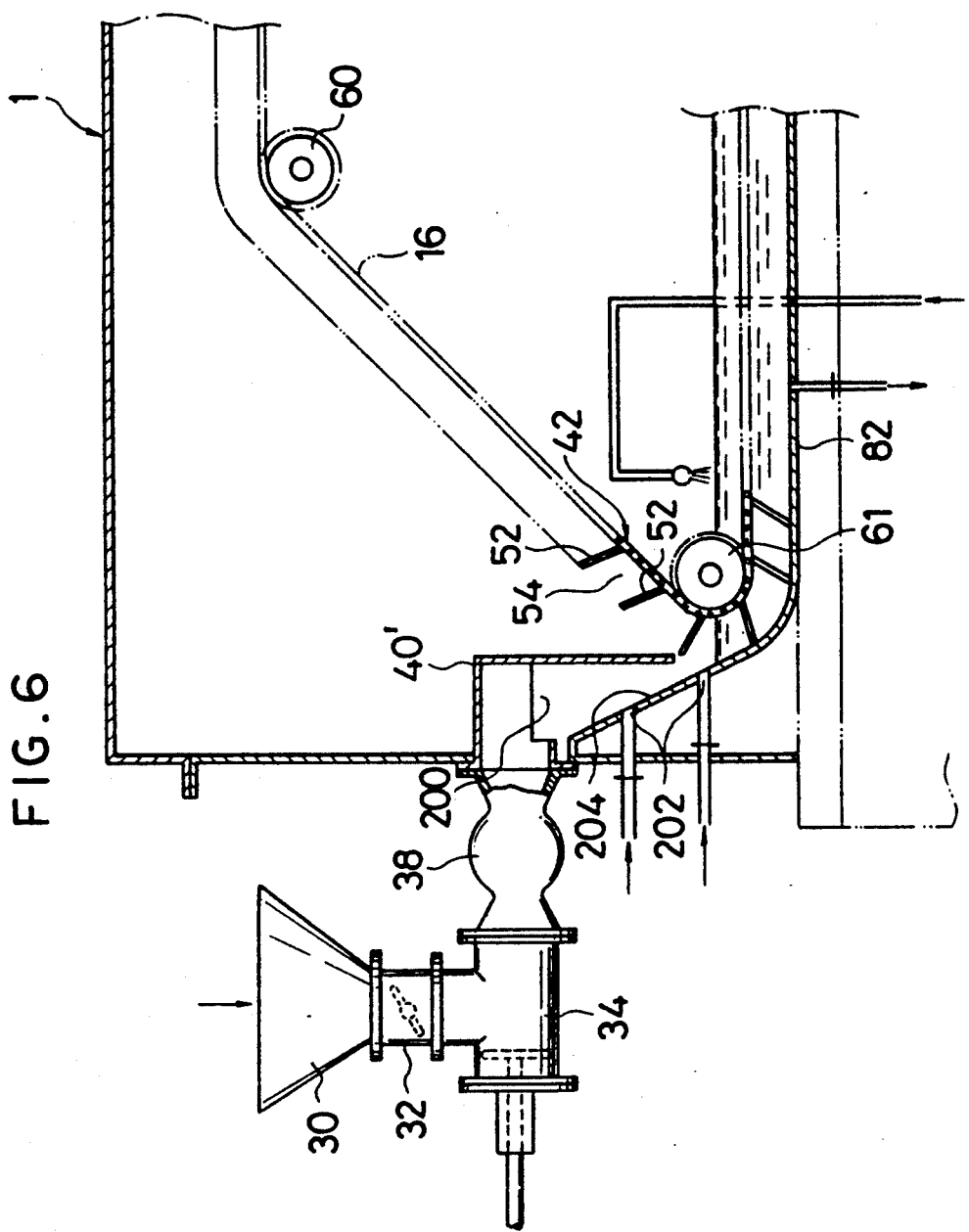

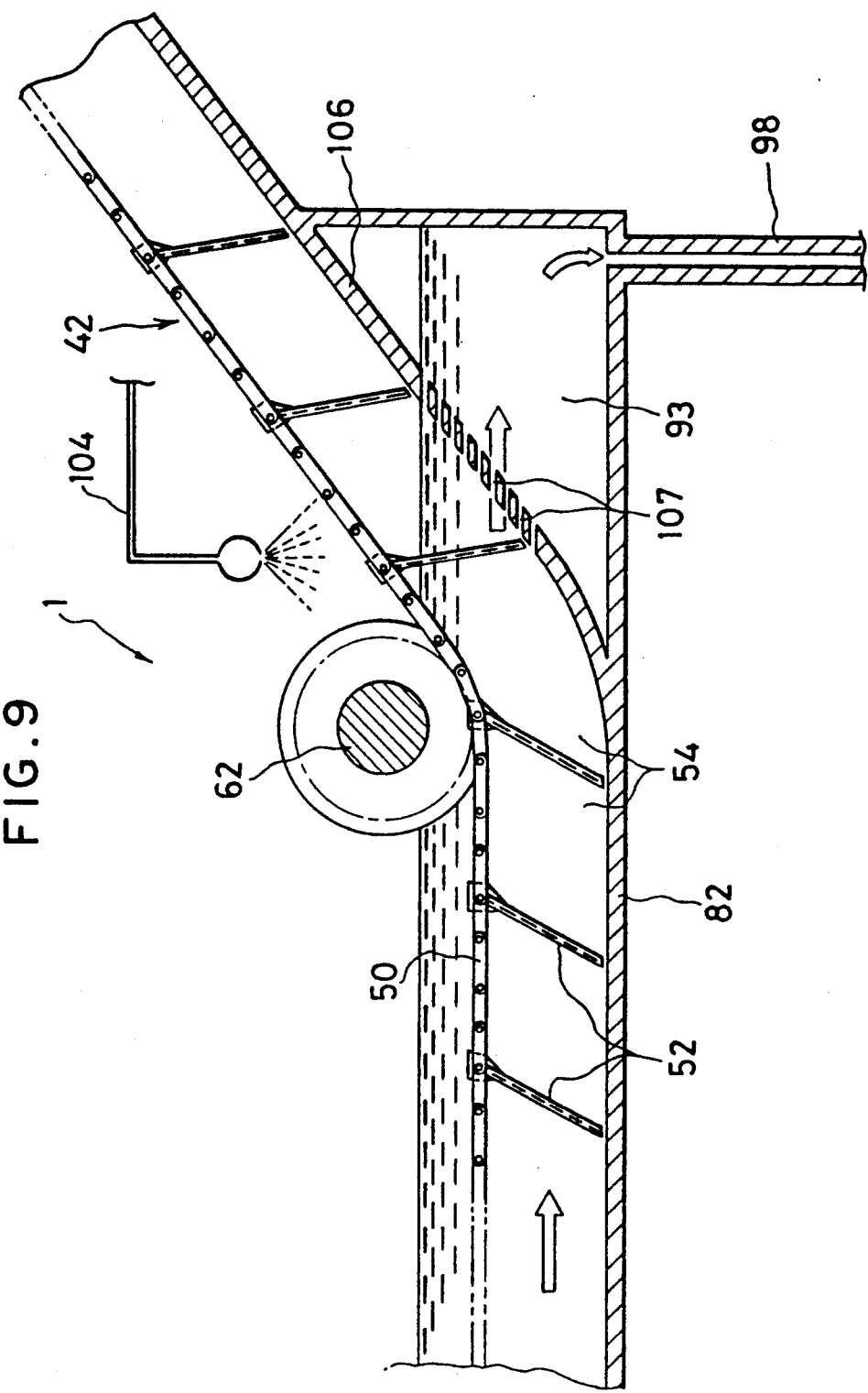

CONTINUOUS VACUUM FRIER

BACKGROUND OF THE INVENTION

Field of the Invention

The present invention relates to a continuous vacuum frier which supplies material to a vacuum frying chamber while maintaining the vacuum therein and continuously fries the material under the vacuum.

Background of the Invention

One of the conventional vacuum friers is disclosed in Japanese Patent Disclosure No. 61-232819. It is of such a type that material to be fried is received within a fry cage which in turn is placed in a vacuum frying chamber. The vacuum frying chamber includes double-door type inlet and outlet ports which are sequentially closed to insulate the vacuum frying chamber from atmosphere. Thereafter, the material in the fry cage are fried in the interior of the vacuum frying chamber.

The other type of vacuum frier is disclosed in Japanese Patent Disclosure No. 62-262954, in which material to be fried is fed through and fried in frying oil under vacuum by the use of a screw conveyor.

The technique disclosed in Japanese Patent Disclosure No. 61-232819 has a limited capacity since the material is fried in a batch manner. Particularly, the opening and closing of the double doors in the inlet and outlet ports for each charge of the fry cage provides an obstruction of increase of the throughput capacity. The vacuum frier in the prior art is difficult to charge and discharge the material to be fried into and from the fry cages. On discharging, a fry cage must be inverted upside down. Additionally, a mechanism for removing the fried products from the inverted fry cage is bulk and complicated in construction. The fried products may be dropped from the inverted fry cage and damaged in part.

In the technique disclosed in Japanese Patent Disclosure No. 62-262954, it is difficult to convey all the material through the frying oil positively by means of the screw conveyor within a given period of time. The time period required to treat the materials is variable. The variable time period raises a problem in that the fried products are variable in quality.

The system described in Japanese Patent Disclosure No. 62-262954 is adapted to remove the fried products through a slanted conveyor. If such a slanted conveyor is less inclined, the entire system will be increased in length. This raises another problem in that the frying oil remains on the less inclined conveyor for a prolonged time of period. On the other hand, if the conveyor is more inclined, the fried products may be less efficiently removed through the conveyor to the impractical extent.

Japanese Patent Disclosure No. 62-262954 describes that the entire frying system is housed within a container resisting the vacuum, the container being evacuated through a vacuum pump. However, it does not describe the concrete construction thereof. In general, it is difficult to maintain airtight in a construction using a screw conveyor for conveying material to be treated. It is also assumed that the materials to be treated cannot be reliably conveyed since most of the material deposit on the screw within the frying oil.

In view of the aforementioned problems in the prior art, it is an object of the present invention to provide a continuous vacuum frier which has a sufficient throughput capacity and which can treat material in frying oil substantially within a given period of time.

Another object of the present invention is to provide a continuous vacuum frier which can effectively prevent the material from depositing on conveyor means.

Still another object of the present invention is to provide a continuous vacuum frier which can positively feed the material within a vacuum frying chamber without creation of any obstructive matter such as clogging.

A further object is to provide a continuous vacuum frier which is reduced in size and can remove fried products out of the frier efficiently and reliably.

A further object is to provide a continuous vacuum frier comprising a taking-out mechanism which can less damage fried products on taking-out.

A further object is to provide a continuous vacuum frier which can effectively prevent the deposition of materials on the conveyor means and the creation of irregularity in frying degree.

SUMMARY OF THE INVENTION

In one aspect, the present invention provides a continuous vacuum frier for feeding material along a path of conveyance within a within a vacuum frying chamber while maintaining the chamber vacuum, comprising material conveying means for conveying the material through frying oil, the material conveying means including endless belt means having a plurality of openings formed therein and a plurality of partitioning members extending downwardly from the endless belt means and each having a plurality of apertures formed therein, the partitioning members defining a plurality of compartments which receive the material and in which the material are fried and conveyed.

In accordance with the one aspect of the present invention, the compartments used for frying and conveying are successively located around the endless belt means. All the material simultaneously thrown into the frier is received in and conveyed through one and the same compartment and thus can be fried substantially within a given period of time.

The frying oil is sprayed toward the endless belt means such that the material can be effectively prevented from depositing on the endless belt means or the partitioning members.

In such an arrangement, means for conveying material to be fried can be located only within a vacuum frying chamber. Thus, the charge and discharge of the material can be reliably and easily performed in the vacuum frying chamber while maintaining it vacuum.

In accordance with the present invention, all the material can be fried substantially within a given period of time to provide vacuum fried products with a stable quality.

The conveyor means of the present invention can efficiently make the frying treatment and the material conveyance since the frying oil is sprayed toward the endless belt means to prevent the deposition of material on the conveyor means effectively during and after the frying process.

In the second aspect, the present invention provides a continuous vacuum frier as constructed according to the first aspect, further comprising a material throwing-in section having an airtight shutter, a cylinder type pushing-out device disposed below the material throwing-in section for moving the material into the vacuum frying chamber, and a pressure shutoff valve located within the path of conveyance in the cylinder type pushing-out device.

When the pressure shutoff valve is closed and the airtight shutter in the material supplying section is opened, material is supplied into the frier. Thereafter, the airtight shutter is closed. Subsequently, the pressure shutoff valve is opened and the cylinder type pushing-out device is then actuated to feed the materials supplied through the material supply section into the vacuum frying chamber. After such a conveyance, the pressure shutoff valve is closed and the next materials are again supplied into the frier through the material supply section.

In the second aspect of the present invention, the continuous vacuum frier can maintain vacuum and efficiently fry the materials by the use of a relatively simple combination of the airtight shutter with the pressure shutoff valve. The continuous vacuum frier has less possibility of malfunction since the materials cannot be deposited and clogged on the material throwing-in section wall and others.

In the third aspect, the present invention provides a continuous vacuum as constructed according to the first aspect of the present invention, comprising a conveying-out ramp for removing fried products out of the frying oil, said ramp being inclined in the range of 40°–60° relative to horizontal, endless belt means disposed to run parallel to said conveying-out ramp and having a plurality of openings formed therein, and partitioning means attached to the endless belt means and inclined in the range of 40°–100° relative to horizontal, the tip portion of the partitioning means being slidable or substantially slidable on said conveying-out ramp.

If the conveying-out ramp is inclined with an angle smaller than 40° relative to horizontal, the length of the endless belt means is elongated in the horizontal direction. This causes the size of the entire machine to increase and also becomes hard to remove the frying oil from the endless belt. If the angle of the ramp exceeds 60°, the angle included between the ramp and the partitioning means will be reduced too much since the partitioning means is attached to the endless belt means running parallel to the conveying-out ramp with the angle of 40°–100° relative to horizontal. This may cause the fried products to damage due to the tendency of depositing on the conveying-out ramp.

If the partitioning means is positioned with an angle relative to horizontal being larger than 100°, any fried product may be damaged by entering between the partitioning means and the conveying-out ramp. If the angle of the partitioning means is smaller than 40°, the fried products remains on the partitioning means and cannot be fed to the subsequent processing step such as centrifugal separation.

In the third aspect of the present invention, the fried products are received and conveyed in a compartment defined by the partitioning members. Therefore, the angle of inclination in the conveying-out ramp can be increased than one which was possible in the prior art. This permits not only to reduce the entire machine in size, but also to render the taking-out of the fried products and to prevent the damage of the fried products. Also for such a reason why the fry cage will not be inverted upside down, the entire construction of the frier can be miniaturized and simplified.

In the fourth aspect, the present invention provides a continuous vacuum frier as constructed according to the first aspect, comprising an oil inlet located upstream in the path of conveyance and an oil outlet disposed downstream in the same path of conveyance.

In such an arrangement, the frying oil can be moved in the same direction as that of the material being fired. Thus, the frying oil aids in conveying the material to be fried. Additionally, the frying oil can effectively prevent the deposition of materials on the conveyor means and the creation of irregularity in frying.

BRIEF DESCRIPTION OF THE DRAWINGS

FIGS. 5A–5D illustrate the centrifugal separator at various operating positions.

FIG. 6 is a cross-sectional view of another modified construction in the material throwing-in section.

FIG. 9 is a view showing, in an enlarged scale, another modified construction in the oil taking-out section.

DETAILED DESCRIPTION OF THE PREFERRED EMBODIMENTS

Figure 1:
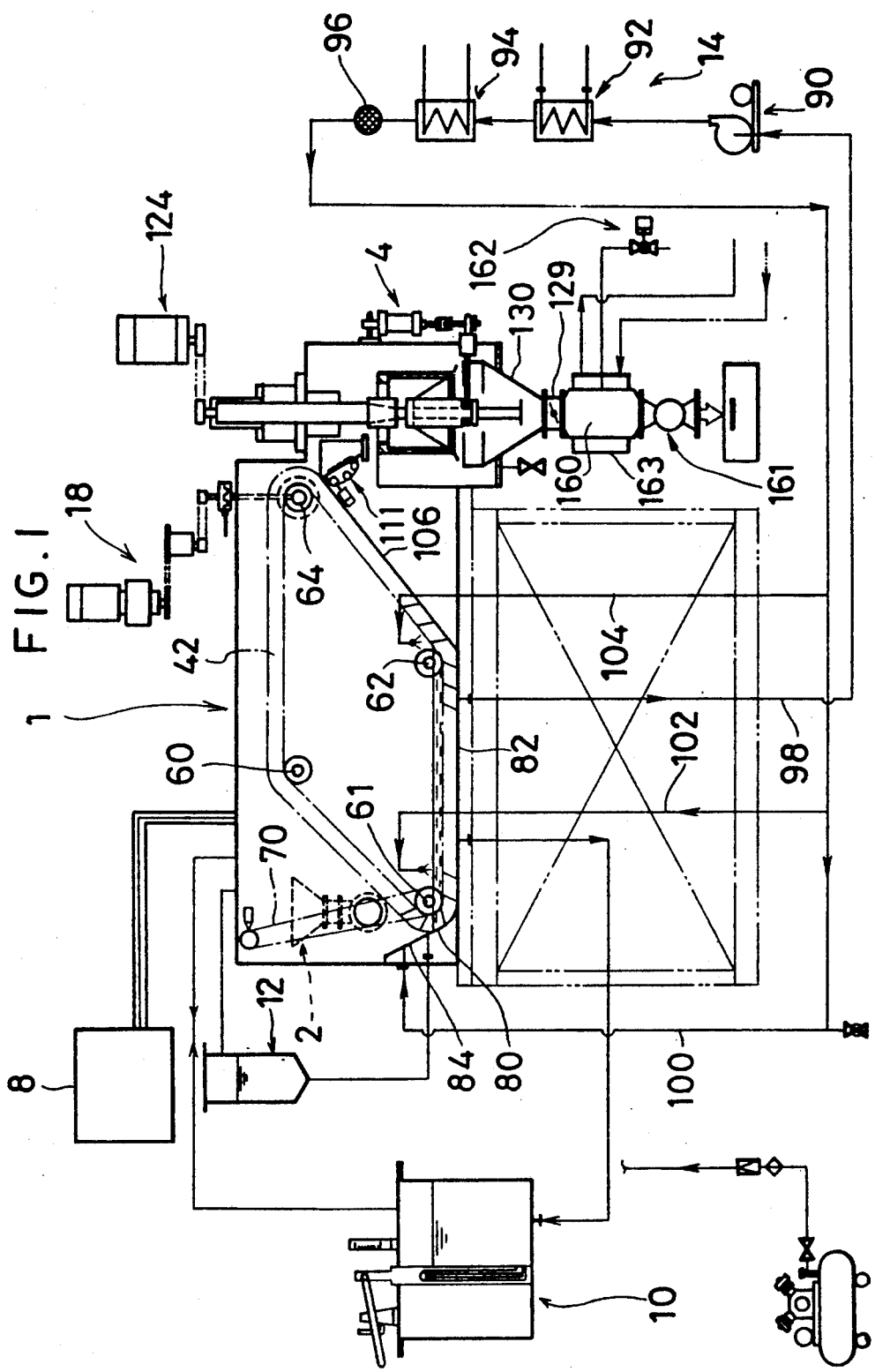
FIG. 1 is a view showing the arrangement of one embodiment of a continuous vacuum frier constructed in accordance with the present invention.

Referring now to FIG. 1, there is shown one embodiment of a continuous vacuum frier constructed according to the present invention, which comprises a vacuum frying chamber 1 for vacuum frying material; a material supply device 2 connected with the vacuum frying chamber 1; and a centrifugal separating device 4 connected with the vacuum frying chamber 1 and adapted to separate the frying oil from the fried products.

The vacuum frying chamber 1 is also connected with an evacuating unit 8 for evacuating the vacuum frying chamber 1; an oil level detector 10 for detecting the level of the oil in the vacuum frying chamber 1; an oil supply tank 12 for supplying the frying oil to the vacuum frying chamber 1; an oil temperature adjusting device 14 for adjusting the temperature of the oil in the vacuum frying chamber 1; and a belt drive device 18 for driving conveyor means such as a net conveyor 42 for conveying the materials into the vacuum frying chamber 1.

As seen from FIG. 2, the material supply device 2 comprises a material hopper 30 for externally receiving material to be fried; an automatic butterfly valve 32 located under the material hopper 30 and functioning as an airtight shutter; and a horizontal pipe section 34 located below the automatic butterfly valve 32 and adapted to receive the material moved past the automatic butterfly valve 32. The horizontal pipe section 34 is connected to the vacuum frying chamber 1 through pipe means (not shown) which includes an electromagnetically actuated valve and a flow regulating valve. As the airtight shutter, the automatic butterfly valve may be replaced by any other suitable valve means such as automatic ball valve, automatic gate valve or the like.

The horizontal pipe section 34 cooperates with a throwing-in bar 37 reciprocatable therewithin, which bar 37 is attached to a hydraulic cylinder 36 functioning as a drive for the supply of materials.

A material throwing-in cover 40 is connected with the horizontal pipe section 34 at a position opposite to the hydraulic cylinder 36 through an automatic ball valve 38 which functions as a pressure shutoff valve. The material throwing-in cover 40 is of a cylinder configuration and extends within the interior of the vacuum frying chamber 1 in a direction perpendicular to the direction of conveyance in the net conveyor 42. A downwardly directed material throwing-in opening 44 is provided in the material throwing-in cover 40 at a position above the net conveyor 42. The material throwing-in cover 40 may be connected with downwardly extending guide means (not shown) which can reliably convey the dropped materials to a material throwing-in position, preferably to a compartment in which the materials are being submerged into the frying oil.

The automatic butterfly valve 32 is automatically opened as materials are thrown in the material hopper 30. After passage of a given time period, the butterfly valve 32 is automatically closed. Subsequently, the electromagnetic valve in the pipe communicating with the vacuum frying chamber 1 is opened to gradually evacuate the interior of the horizontal pipe section 34. Thereafter, the automatic ball valve 38 is automatically opened immediately before the throwing-in bar 37 begins to move the materials to the throwing-in opening 44. As the throwing-in bar 37 is retracted after completion of the pushing-out movement thereof, the automatic ball valve 38 is closed. In such a manner, the material supply device 2 can supply material to the frier while maintaining the vacuum frying chamber 1 vacuum.

Figure 2:
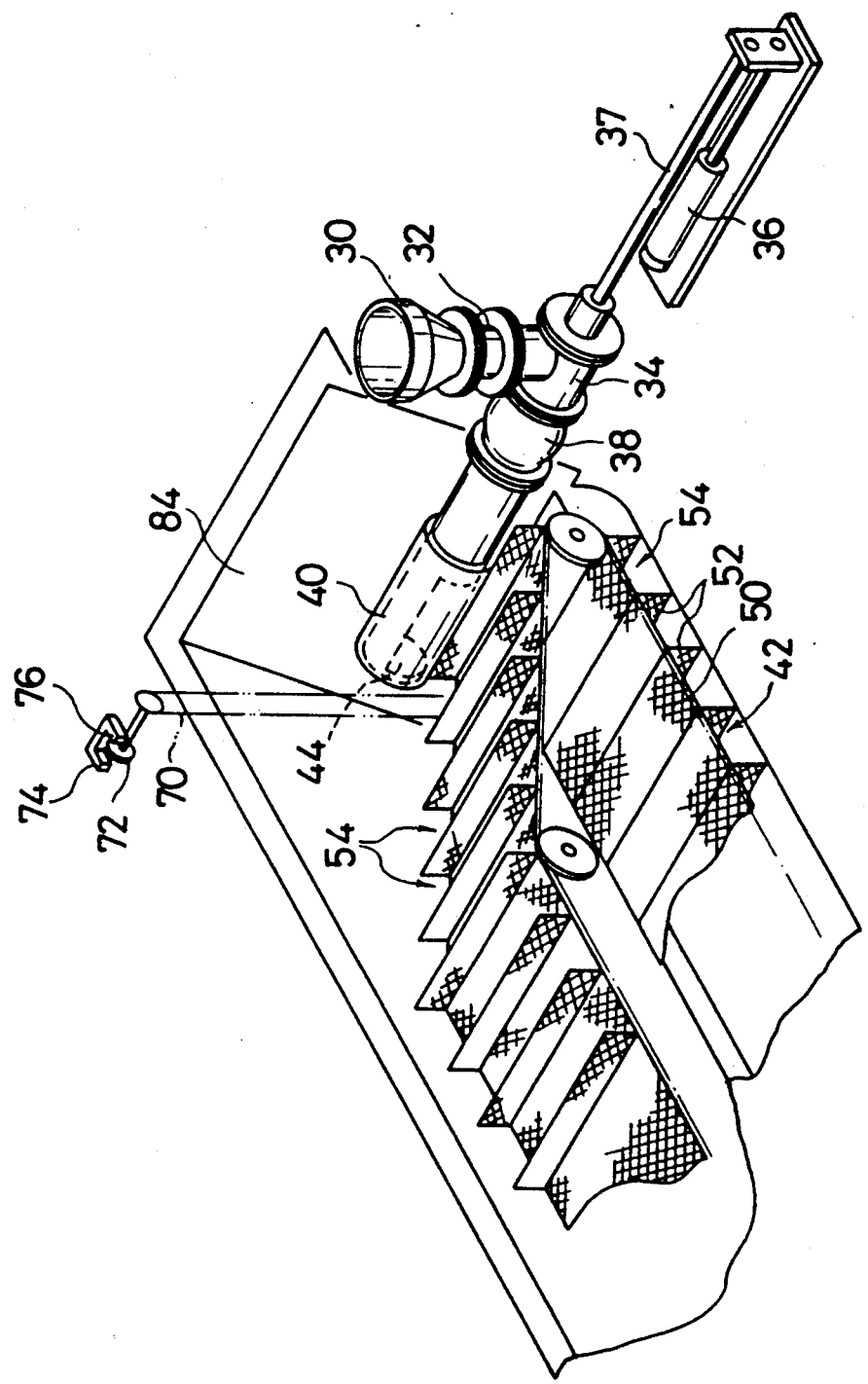
FIG. 2 is a perspective view of the material throwing-in section.

The net conveyor 42 for conveying the material in the vacuum frying chamber 1 comprises a plurality of partitioning nets 52 extending substantially outwardly from a net-like endless belt 50, as shown in FIG. 2. The width of the vacuum frying chamber 1 in a direction perpendicular to the direction of conveyance in the net conveyor 42 is substantially equal to the width of the endless belt and partitioning nets 50, 52. Thus, a plurality of compartments 54 opened outwardly will be formed on the net conveyor 42. Each of the compartments 54 receives a given amount of material. Each of the partitioning nets 52 is inclined relative to the endless belt 50 with such an angle as will be described later.

As shown in FIG. 1, the net conveyor 42 is guided by means of three guide pulleys 60, 61 and 62 and intermittently driven by means of a drive pulley 64. The net conveyor 42 runs substantially along a parallelogram-shaped path. The section of the net conveyor 42 corresponding to the bottom side of the parallelogram is submerged in the frying oil. In this bottom conveyor section, the material will be fried. The net conveyor 42 is intermittently moved one time for each time period ranged between ten seconds and ten minutes by a distance corresponding to the dimension of one compartment measured in the direction of conveyance on the net conveyor 42.

As seen from FIG. 1 and 2, the guide pulley 61 is connected with an optical rotary disc 72 which is positioned outside the vacuum frying chamber 1 and rotated through a chain 70. The optical disc 72 is disposed between light emitting means 74 and light receiving means 76. Thus, such a sensor can detect the rotational angle of the guide pulley 61 and thus the distance of conveyance of the net conveyor 42.

A curved surface 80 partially surrounds the lower portion of the guide pulley 61. The curved surface 80 has a curvature, about the rotational axis of the guide pulley 61, substantially following the locus of the forward edges of the moving partitioning nets 52. The lower end of the curved surface 80 is joined to the bottom surface of the vacuum frying chamber 1 while the upper end thereof is coupled with a slanted guide plate 84 for guiding the thrown material into each of the compartments 54. The curved surface 80 serves to secure that when each of the compartments 54 is inverted with the top opening thereof being downwardly directed, the material is easily discharged from the compartment 54 through the top opening thereof without clogging. It is preferred that the material is thrown in each of the compartment at the beginning of frying at which part of that compartment begins to be submerged into the frying oil.

The level of oil within the vacuum frying chamber 1 is sensed by the oil level detector 10 shown in FIG. 1. If the frying oil in the vacuum frying chamber 1 is consumed below a predetermined level, it is detected by the oil level detector 10 which in turn actuates an oil level controlling system (not shown). The oil level controlling system then provides a signal to the oil supply tank 12 which in turn is actuated to re-supply new frying oil. In the illustrated embodiment, the level of oil is maintained above the endless belt 50 in the horizontal path of conveyance wherein each of the compartment 54 is positioned upside down. Depending on the type of oil and the temperature of oil, however, the level of oil may be positioned below the endless belt 50.

The oil temperature adjusting device 14 maintains the frying oil at a predetermined temperature, for example, any suitable temperature ranged between 80°–120° by circulating the frying oil from the vacuum frying chamber 1 through a cooling unit 92 or heating unit 94 and a filter unit 93 by an oil pump 90.

The oil temperature adjusting device 14 includes an oil discharge pipe 98 which communicates with a double-bottomed oil tank 93, as shown in FIG. 9. The double-bottomed oil tank 93 is connected to the vacuum frying chamber 1 through a plurality of small apertures 107 which are formed in a conveying-out ramp 106, which will be described in detail, at a position adjacent to the end of the path of frying treatment in the net conveyor 42.

After the oil has been adjusted up to a predetermined temperature by the oil temperature adjusting device 14, part of the adjusted oil is returned on the upper portion of the slanted guide plate 84 through an oil return pipe 100. This can prevent the material from depositing on the slanted guide plate 84.

After being adjusted with respect to the temperature thereof, another part of the oil is further sprayed through a pipe 102 substantially toward the bottom, horizontal portion of the net conveyor 42 adjacent the guide pulley 61 located at the bottom run of the net conveyor 42. Thus, the floating material being fried can be prevented from depositing on the net conveyor 42 and also the material deposited on the net conveyor 42 can be separated therefrom. The sprayed oil portion also serves to agitate the frying oil so as to prevent any irregularity in frying. Additionally, the sprayed oil portion can add thermal energy to the body of frying oil at the beginning of the frying operation.

It is preferred that still another part of the oil adjusted to the predetermined temperature is further sprayed toward the endless belt 50 through a pipe 104 at a position adjacent to the lower portion of the conveying-out ramp 106 for conveying the fried products from the vacuum frying chamber 1 to the centrifugal separating device 4, that is, the oil is sprayed through pipe 104 near a position at which the endless belt 50 exits the frying oil. This serves to separate the fried products from the endless belt 50.

As described previously, the frying oil adjusted to the predetermined temperature is returned into the vacuum frying chamber 1 at the upper portion of the slanted guide plate 84, an upper position near the guide pulley 61 and near the position in which the endless belt 50 exits the frying oil. The frying oil is then discharged outwardly through small apertures 107 formed in the ramp near the end of the path of frying treatment. As a result, the frying oil will always be flowed along the path of material conveyance from the upstream to the downstream side. This can effectively prevent the material from depositing on the conveying means (at the face thereof on the downstream side of each partitioning nets 52). Furthermore, the flow of frying oil serves, together with the intermittent motion of the compartments 54, to agitate the material in each of the compartments 54 very well to avoid any irregularity in frying effectively.

Figure 3:
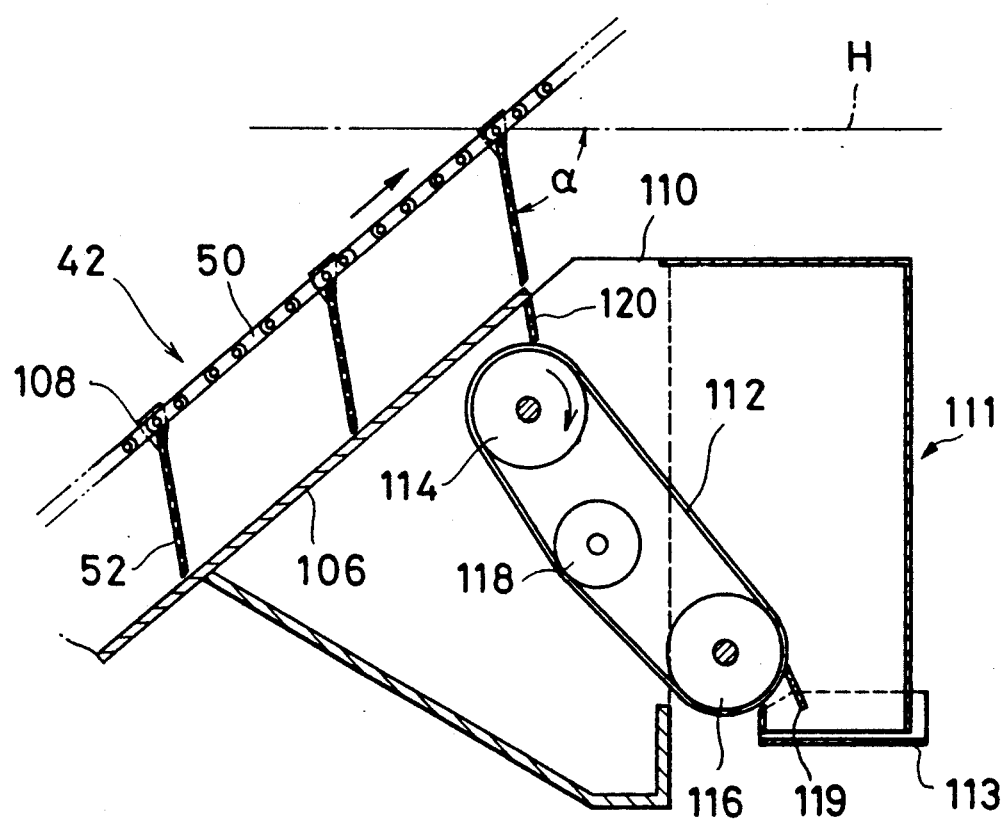
FIG. 3 is a cross-sectional view showing ramp and duct for conveying the fried products out of the frier.

As shown in FIG. 3, the endless belt 50 is spaced above the conveying-out ramp 106 and runs parallel thereto. The ramp 106 is disposed with an angle ranged between 40°-60°, relative to horizontal. Each of the partitioning nets 52 is mounted on the endless belt 50 through a fixture 108 such that the angle of the partitioning net relative to the horizontal line H, that is, the angle of conveyance slope α in the partitioning net is ranged between 40°-100°, preferably between 80°-90°.

Hopper means 111 is disposed below the discharge port 110 of the vacuum frying chamber 1, as shown in FIG. 3. The hopper means 111 includes an endless conveying-out belt 112 moveably supported on part of the sidewall 120 and formed of a thin and surface finished sheet of stainless steel. This endless belt 112 is spanned between upper and lower pulleys 114, 116 and a tension roller 118. The endless conveying-out belt 112 is engaged by a doctor knife 119 at a position wherein the belt 112 passes over the lower pulley 116. The hopper means 111 includes a shutter 113 at the lower end thereof.

The centrifugal separating device 4 is located below the hopper means 111. As seen from FIG. 4, the centrifugal separating device 4 comprises a centrifugal separator 122 receiving the fried products from the hopper means 111; a drive 124 for driving the centrifugal separator 122; a hopper 130 disposed below the centrifugal separator 122, the hopper 130 having an airtight shutter 129 at the lower end thereof; and an oil collecting barrel 131 for collecting the oil separated from the products by means of the centrifugal separator 122.

Figure 4:
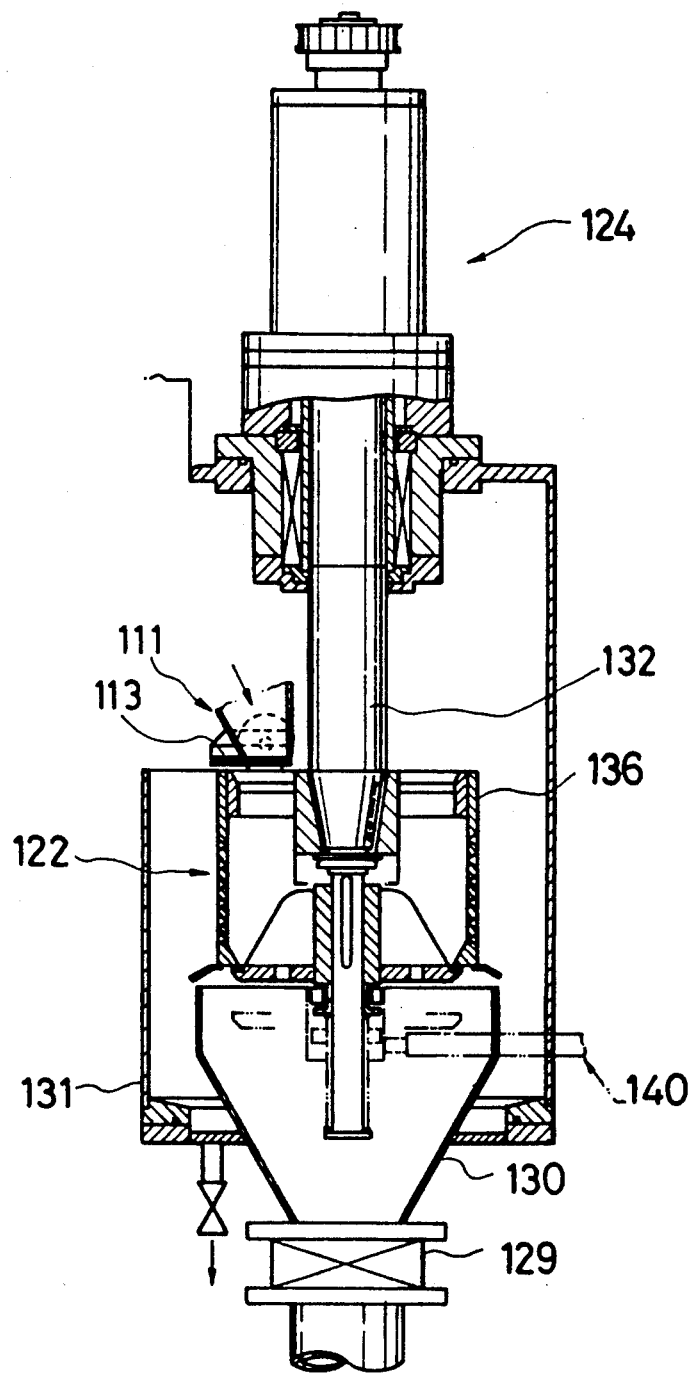
FIG. 4 is a cross-sectional view of the centrifugal separator.

As shown in FIG. 5, the centrifugal separator 122 is integrally mounted on a rotating drive shaft 132 which in turn is connected to a drive 124 (FIG. 4). The centrifugal separator 122 comprises a cylinder member 136 including a number of small apertures 134 formed therethrough; a bottom lid member 138 reciprocatable between a position in which the bottom lid member 138 engages the lower end portion of the cylinder member 136 without gap and another position in which the bottom lid member 138 is spaced apart from the lower end portion of the cylinder member 136 to form a gap through which the fried products can pass; and a bottom lid drive 140 for moving the bottom lid member 138 vertically between said two positions.

The bottom lid member 138 is substantially of a conical configuration and has a central raised portion and a horizontal flange 139 on the peripheral edge thereof. The bottom lid member 138 is biased upwardly under the action of a coil spring 144 which is mounted about a spring core member 142 extending downwardly from the lower end of the rotary shaft 132. Normally, the bottom lid member 138 engages the lower end face of the cylinder member 136 to close the bottom opening thereof.

The bottom lid drive 140 comprises a drive shaft 146 and a C-shaped arm member 154 mounted on the forward end of the drive shaft 146 and adapted to engage in a circumferential groove which is defined by two flange 150 and 152 on the spring core member 142.

The operation of the centrifugal separating device 4 will now be described with reference to FIG. 5. As shown in FIG. 5(A), the bottom lid member 138 is biased against the cylinder member 136 to close the bottom opening thereof, under the biasing force of the coil spring 144. If a given amount of products are accumulated in the hopper means 111, the shutter 113 is opened to throw the products into the centrifugal separator 122. The thrown products are accumulated in a space defined by the cylinder member 136 and the bottom lid member 138 at its lower section.

Subsequently, as shown in FIG. 5(B), the rotary drive 124 (FIG. 4) is energized to rotate the cylinder and bottom lid members 136, 138 as a unit through the drive shaft 132. For example, the rotational velocity may be set at 300-1,500 revolutions per minute. In such a manner, the products can be moved along the internal face of the cylinder member 136. Since the outer wall of the bottom lid member 138 is raised at its center and inclined outwardly, the products will not concentrate on the bottom face of the cylinder member 136, but being spread throughout the inner wall of the cylinder member. Thus, the oil can be separated from the products substantially uniformly. The separated oil flows outwardly through the small apertures 134 in the cylinder member 136 and collected in the oil collecting barrel 131. The collected oil is discharged from the oil collecting barrel 131 to any external reservoir through piping (not shown) which has airtight shutter means.

Figure 5C:
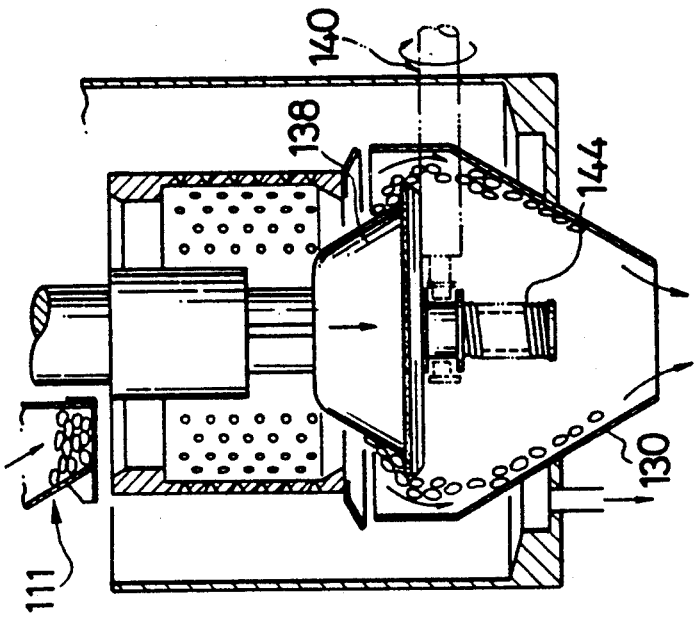

Subsequently, all the rotational motion of the rotating components is stopped. As shown in FIG. 5(C), the products are again dropped into the lower portion of the space defined by the cylinder and bottom lid members 136, 138.

Figure 5D:
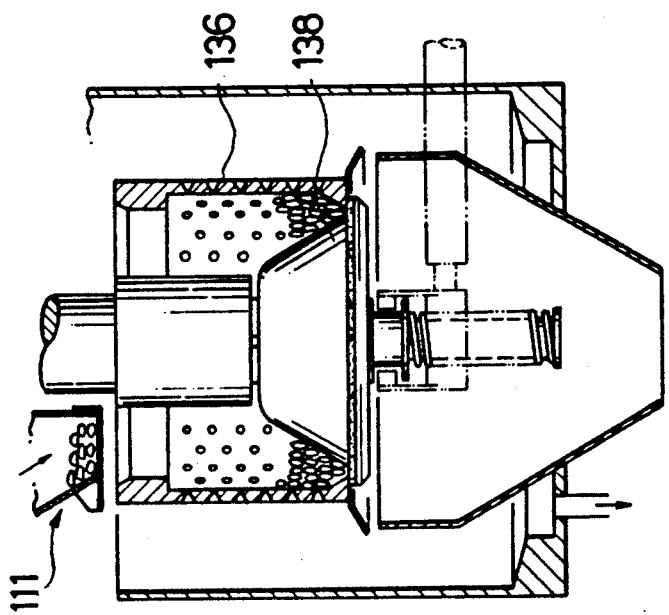

As shown in FIG. 5(D), subsequently, the bottom lid drive 140 is energized to move the bottom lid member 138 downwardly against the biasing force of the coil spring 144. As a result, said gap will be formed between the lower end face of the cylinder member 136 and the bottom lid member 138. The products may be dropped into the hopper 130 through said gap.

Thereafter, the bottom lid drive 140 is de-energized to allow the bottom lid member 138 to move upwardly under the action of the coil spring 144. Thus, the bottom opening of the cylinder member 136 may be closed by the bottom lid member 138, as shown in FIG. 5(A).

The airtight shutter 129 of the hopper 130 communicates with a product taking-out chamber 160, as shown in FIG. 1. The product taking-out chamber 160 is provided, at its lower end, with a pressure shutoff valve 161 for taking-out the products. The product taking-out chamber 160 also includes a pressure regulator 162 which is usable on returning the interior of the product taking-out chamber from the vacuum to the normal pressure. It is preferred that the product taking-out chamber further includes a cooling mechanism 163 which can cool and set the products such that the products will be effectively avoided from deforming on returning the product taking-out chamber from the vacuum to the normal pressure.

The process of taking out the products will now be described below.

When a predetermined amount of products are accumulated in the hopper 130, the airtight shutter 130 is opened to drop the products into the product taking-out chamber 160. Thereafter, the airtight shutter 129 is closed. The cooling mechanism 163 is then energized to cool the products up to a predetermined temperature. The pressure adjusting mechanism 162 is subsequently energized to return the internal pressure of the product taking-out chamber 160 from the vacuum to the normal pressure. Finally, the pressure shutoff valve 161 is opened so that the products can be removed out of the frier.

Another embodiment of a material supply device is shown in FIG. 6. In this embodiment, components common to those of the first embodiment shown in FIG. 2 are designated by similar reference numerals and will not be further described.

The horizontal pipe section 34, the material throwing-in bar 37 and the material throwing-in cover 40 have a common axis which is aligned with the direction of conveyance in the endless material conveying belt 16. The ramp 204 located below the throwing port 200 of the throwing-in cover 40 is preferably provided with a plurality of oil outlet ports 202 to which the oil is fed from an oil pump 90 shown in FIG. 1. Therefore, the oil is always flowing on the ramp 204 so that the supplied material will not accumulate thereon.

Figure 7:
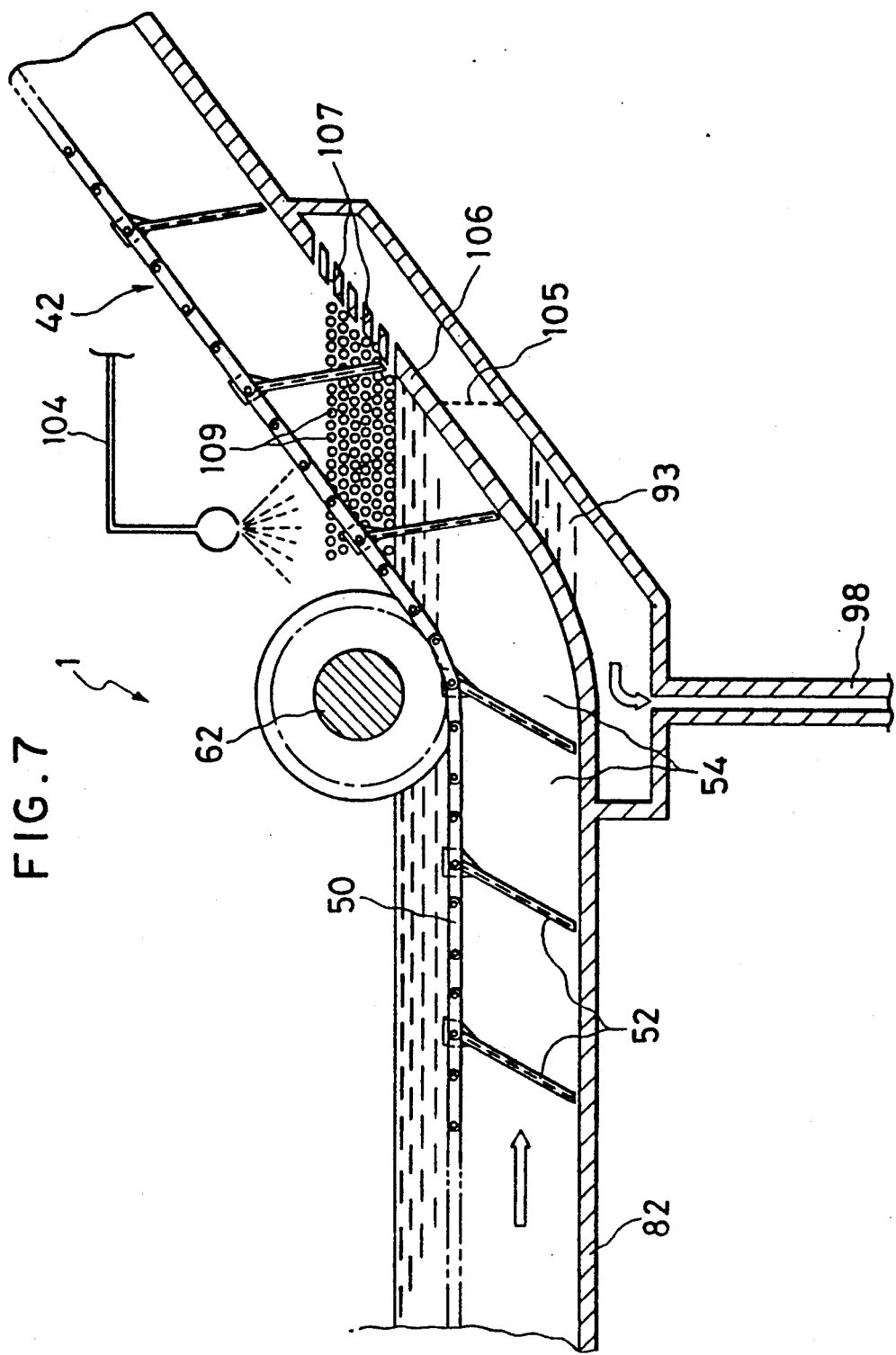
FIG. 7 is a view showing, in an enlarged scale, an oil taking-out section in the second embodiment of the present invention.

FIG. 7 shows the second embodiment of an oil discharge section according to the present invention, in which components common to those of the first embodiment are denoted by similar reference numerals and will not be described further. In FIG. 7, a plurality of small side apertures 109 are formed in the sides of the path of frying treatment in addition of the small apertures 107 on the discharge ramp 106 for discharging the oil. The double-bottomed oil tank 93 located below the discharge ramp 106 and communicating with the small side apertures 109 is provided with a filter 105 for filtrating the used frying oil to eliminated undesirable matters therefrom.

Figure 8:
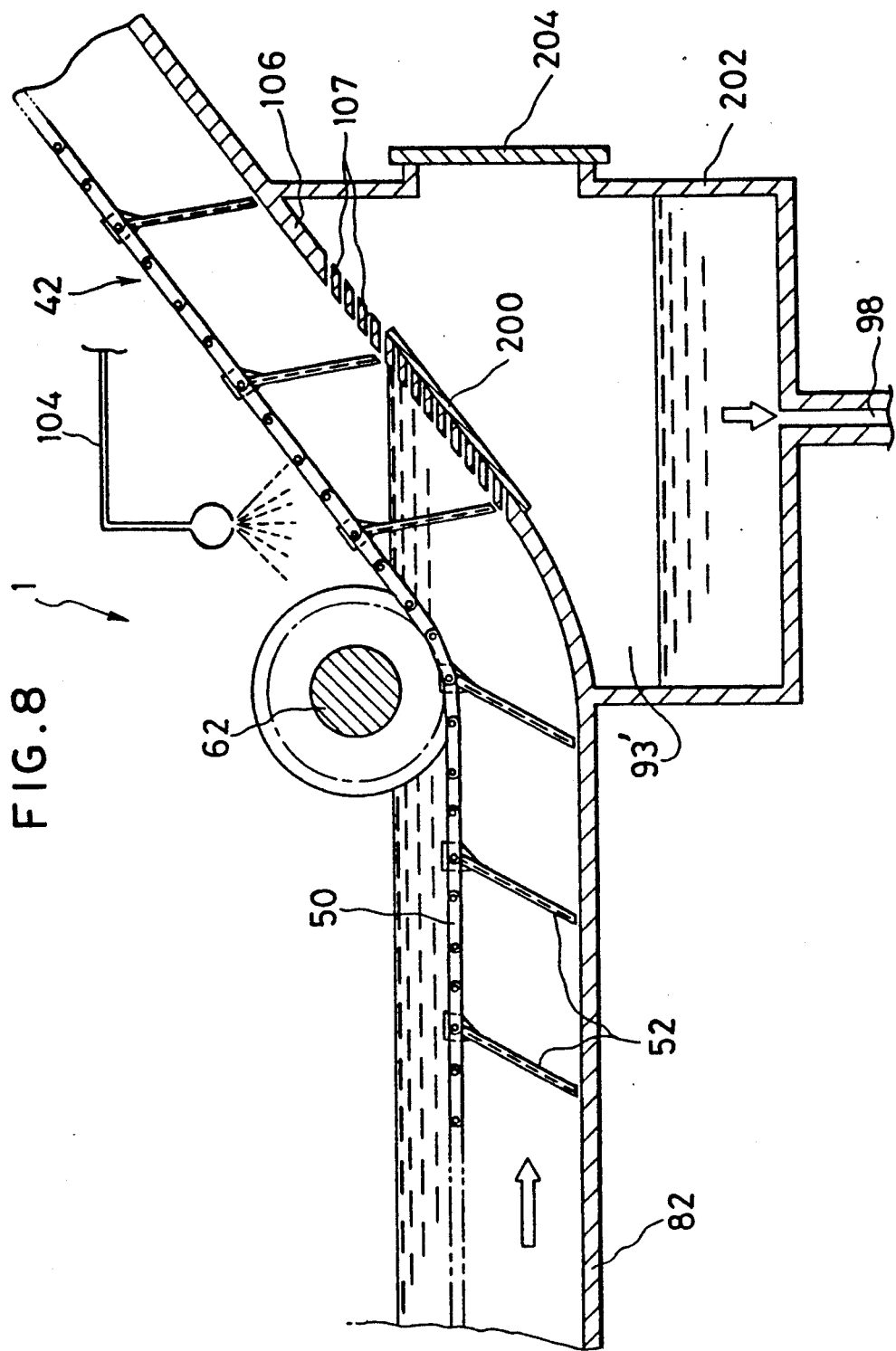
FIG. 8 is a view showing, in an enlarged scale, an oil taking-out section in the third embodiment of the present invention.

The third embodiment of an oil discharge section according to the present invention is shown in FIG. 8, which comprises a relatively large double-bottomed oil tank 93' disposed below the small ramp apertures 107 in the discharge ramp 106. An adjustable baffle plate 200 is disposed within the interior of the double-bottomed oil tank 93' to close the small ramp apertures 107 at any level from the lowermost aperture. The position of the adjustable baffle plate 200 can be manually adjusted through a hatch 204 which is formed in the oil tank 93' at a position opposed to the baffle plate 20. Alternatively, the baffle plate 200 may be remotely adjusted with respect to its level through any external control mechanism. The level of oil in the vacuum frying chamber can be selected by adjusting the position of the baffle plate 200.

What is claimed is:

1. Apparatus for frying material in frying oil, comprising:

a vacuum frying chamber for receiving frying oil, said vacuum frying chamber having a bottom wall and an upper portion above said bottom wall;

vacuum means for evacuating said frying chamber;

material conveying means for conveying material in a generally horizontal plane in a direction of conveyance through frying oil in said frying chamber, said material conveying means including an endless belt having a plurality of openings formed therein and a plurality of partitioning members fixedly extending outwardly from said endless belt, said endless belt including a generally horizontal portion positioned in said frying chamber and said horizontal portion having an upstream end proximate a position at which frying of the material begins and a downstream end proximate a position at which frying of the material terminates, said endless belt further including an upstream portion upstream of said upstream end of said horizontal portion and a downstream portion downstream of said downstream end of said horizontal portion, said endless belt following a curved path at said upstream end where said upstream portion joins said horizontal portion, said partitioning members extending downwardly at said horizontal portion, said partitioning members defining a plurality of compartments which receive the material and in which the material is fried and conveyed, and said partitioning members having tip portions, said tip portions moving in a path parallel to said endless belt, and said material conveying means further including oil spraying means for spraying the frying oil downwardly proximate said upstream end;

guide means for guiding the material into said compartments, said guide means extending at an acute angle to the path of said tip portions at said upstream portion of said endless belt;

a curved surface partially surrounding said endless belt at said upstream end, said curved surface following the path of said tip portions of said partitioning members, and said curved surface having a lower end joined to said bottom wall of said frying chamber and an upper end joined to said guide means, whereby said curved surface retains the material in said compartments adjacent said upstream end of said endless belt; and a first oil inlet positioned upstream of said horizontal portion of said endless belt, a second oil inlet positioned downstream of said horizontal portion of said endless belt, and oil supply means for supplying oil to said endless belt through said first and second oil inlets.

2. The apparatus of claim 1, wherein said material conveying means further includes oil spraying means for spraying the frying oil downwardly proximate said downstream end.

3. The apparatus of claim 1, wherein said horizontal portion of said endless belt is positioned in said frying chamber to move the material through the frying oil.

4. The apparatus of claim 1, further comprising:

material supply means for supplying material to said frying chamber while maintaining a vacuum in said frying chamber, said material supply means including a material throwing-in section having air-tight shutter means for automatically opening as material is thrown into said material supply device and automatically closing after a selected period of time;

a pipe disposed below said material throwing-in section and having a pipe inlet in communication with said material throwing-in section through said shutter means and a pipe outlet separate from said pipe inlet;

pusher means disposed in said pipe for pushing the material out of said horizontal pipe through said pipe outlet; and an automatic valve having a valve inlet in communication with said pipe outlet and a valve outlet in communication with said frying chamber.

5. The apparatus of claim 4, wherein said pusher means includes a pushing-out member reciprocatable in a direction parallel to said direction of conveyance.

6. The apparatus of claim 4, wherein said pusher means includes a pushing-out member reciprocatable in a direction perpendicular to said direction of conveyance.

7. The apparatus of claim 4, wherein said pusher means includes a discharge portion, a side wall portion positioned below the level of said discharge portion, said side wall portion defining said guide means, and oil introduction means for introducing frying oil onto said side wall portion.

8. The apparatus of claim 7, wherein said oil introduction means includes apertures in said side wall, the frying oil moving outwardly through said apertures onto said side wall.

9. The apparatus of claim 1, wherein said endless belt has a conveying-out portion positioned adjacent said downstream end of said horizontal portion of said endless belt and at an angle relative to said horizontal portion of said endless belt, and wherein said apparatus further comprises:

a ramp parallel to and below said conveying-out portion, said ramp forming an angle in the range of 40° to 60° relative to horizontal and an angle in the range of 120° to 140° relative to said horizontal portion of said endless belt, wherein said partitioning members extending out from said conveying-out portion of said ramp have a tip portion which slides over said ramp; and wherein said partitioning members form an angle in the range of 40° to 100° relative to horizontal and each have a tip portion slidable on said ramp.

10. The apparatus of claim 9, wherein said partitioning members comprise nets.

11. The apparatus of claim 9, wherein said partitioning members form an angle in the range of 80° to 90° relative to horizontal.

12. The apparatus of claim 1, wherein said vacuum frying chamber includes two bottom walls, said two bottom walls defining a space therebetween, and overflow means for introducing oil overflowed from said vacuum frying chamber into said space.

13. The apparatus of claim 12, further comprising filter means positioned between said two bottom walls for filtering the overflowed oil to remove undesirable material therefrom.

14. Apparatus for frying material in frying oil, comprising:

a vacuum frying chamber for receiving frying oil, said vacuum frying chamber having a bottom wall and an upper portion above said bottom wall;

vacuum means for evacuating said frying chamber;

material conveying means for conveying material in a generally horizontal plane in a direction of conveyance through frying oil in said frying chamber, said material conveying means including an endless belt having a plurality of openings formed therein and a plurality of partitioning members fixedly extending outwardly from said endless belt, said endless belt including a generally horizontal portion positioned in said frying chamber and said horizontal portion having an upstream end proximate a position at which frying of the material begins and a downstream end proximate a position at which frying of the material terminates, said endless belt further including an upstream portion upstream of said upstream end of said horizontal portion and a downstream portion downstream of said downstream end of said horizontal portion, said endless belt following a curved path at said upstream end where said upstream portion joins said horizontal portion, said partitioning members extending downwardly at said horizontal portion, said partitioning members defining a plurality of compartments which receive the material and in which the material is fried and conveyed, and said partitioning members having tip portions, said tip portions moving in a path parallel to said endless belt;

guide means for guiding the material into said compartments, said guide means extending at an acute angle to the path of said tip portions at said upstream portion of said endless belt;

a curved surface partially surrounding said endless belt at said upstream end, said curved surface following the path of said tip portions of said partitioning members, and said curved surface having a lower end joined to said bottom wall of said frying chamber and an upper end joined to said guide means, whereby said curved surface retains the material in said compartments adjacent said upstream end of said endless belt; and a first oil inlet positioned upstream of said horizontal portion of said endless belt, a second oil inlet positioned downstream of said horizontal portion of said endless belt, and oil supply means for supplying oil to said endless belt through said first and second oil inlets.

15. The apparatus of claim 14, wherein said material conveying means further includes oil spraying means for spraying the frying oil downwardly proximate said downstream end.

16. The apparatus of claim 14, wherein said horizontal portion of said endless belt is positioned in said frying chamber to move the material through the frying oil.

17. The apparatus of claim 14, further comprising:

material supply means for supplying material to said frying chamber while maintaining a vacuum in said frying chamber, said material supply means including a material throwing-in section having air-tight shutter means for automatically opening as material is thrown into said material supply device and automatically closing after a selected period of time;

a pipe disposed below said material throwing-in section and having a pipe inlet in communication with said material throwing-in section through said shutter means and a pipe outlet separate from said pipe inlet;

pusher means disposed in said pipe for pushing the material out of said horizontal pipe through said pipe outlet; and an automatic valve having a valve inlet in communication with said pipe outlet and a valve outlet in communication with said frying chamber.

18. The apparatus of claim 17, wherein said pusher means includes a pushing-out member reciprocatable in a direction parallel to said direction of conveyance.

19. The apparatus of claim 17, wherein said pusher means includes a pushing-out member reciprocatable in a direction perpendicular to said direction of conveyance.

20. The apparatus of claim 17, wherein said pusher means includes a discharge portion, a side wall portion positioned below the level of said discharge portion, said side wall portion defining said guide means, and oil introduction means for introducing frying oil onto said side wall portion.

21. The apparatus of claim 20, wherein said oil introduction means includes apertures in said side wall, the frying oil moving outwardly through said apertures onto said side wall.

22. The apparatus of claim 14, wherein said endless belt has a conveying-out portion positioned adjacent said downstream end of said horizontal portion of said endless belt and at an angle relative to said horizontal portion of said endless belt, and wherein said apparatus further comprises:

a ramp parallel to and below said conveying-out portion, said ramp forming an angle in the range of 40° to 60° relative to horizontal and an angle in the range of 120° to 140° relative to said horizontal portion of said endless belt, wherein said partitioning members extending out from said conveying-out portion of said ramp have a tip portion which slides over said ramp; and wherein said partitioning members form an angle in the range of 40° to 100° relative to horizontal and each have a tip portion slidable on said ramp.

23. The apparatus of claim 22, wherein said partitioning members comprise nets.

24. The apparatus of claim 22, wherein said partitioning members form an angle in the range of 80° to 90° relative to horizontal.

25. The apparatus of claim 14, wherein said vacuum frying chamber includes two bottom walls, said two bottom walls defining a space thereinbetween, and overflow means for introducing oil overflowed from said vacuum frying chamber into said space.

26. The apparatus of claim 25, further comprising filter means positioned between said two bottom walls for filtering the overflowed oil to remove undesirable material therefrom.

* * * * *